United States Patent
Schmidt

[11] Patent Number: 5,513,185
[45] Date of Patent: Apr. 30, 1996

[54] METHOD AND APPARATUS FOR TRANSMISSION LINK ERROR RATE MONITORING

[75] Inventor: Douglas C. Schmidt, Holmdel, N.J.

[73] Assignee: AT&T Corp., Murray Hill, N.J.

[21] Appl. No.: 979,958

[22] Filed: Nov. 23, 1992

[51] Int. Cl.⁶ .................................................. G06F 11/00
[52] U.S. Cl. .................................. 371/5.5; 371/5.1
[58] Field of Search ............................ 371/5.1, 5.2, 5.3, 371/5.5, 32, 34; 375/109

[56] References Cited

U.S. PATENT DOCUMENTS

| | | | |
|---|---|---|---|
| 4,309,767 | 1/1982 | Andow et al. | 371/24 |
| 4,363,123 | 12/1982 | Grover | 371/5 |
| 4,385,383 | 5/1983 | Karchevski | 371/5 |
| 4,769,761 | 9/1988 | Downes et al. | 364/514 |
| 5,138,616 | 8/1992 | Wagner, Jr. et al. | 371/5.1 |
| 5,271,011 | 12/1993 | McMullan, Jr. et al. | 371/5.5 X |
| 5,331,642 | 7/1994 | Valley et al. | 371/5.1 |

OTHER PUBLICATIONS

Manoharan, L. C. et al "Bit Rate/Bit Error Rate Monitor", Journal of the Institution of Engineers (India) Electronics and Telecommunication Engineering Division, vol. 66, pp. 52–54, Nov. 1985–Feb. 1986.
G. W. Kajos, "The FDDT Link Error Rate Monitor", Proceedings of the 14th Conference on Local Computer Networks, pp. 347–357 No Date.

*Primary Examiner*—Emanuel T. Voeltz
*Assistant Examiner*—M. Kemper

[57] ABSTRACT

An error rate monitor determines, on a safe and effective basis, when a transmission link is experiencing excessive errors and should be taken out of service. Safety is assured by performing a changeover when the amount of data awaiting transmission via the link gets too high; effectiveness is assured by keeping the link in service despite short term error bursts that can be overcome by data retransmission. In one monitor arrangement, errors that occur in the transmission link during a fixed time interval are monitored. If one or more errors occur in an interval, an increment is added to a counter (originally initialized to zero). If no errors occur in the interval, a decrement is subtracted from the counter, to a minimum of zero. The increment and decrement values are determined as a joint function of (a) the round trip delay on the transmission link, (b) the maximum allowable error rate on the link, and (c) the link speed, so that, in general, the increment and decrement values are significantly different. When the counter exceeds a given threshold, T, a changeover is declared. The value of T is determined as a joint function of (a) the maximum amount of data in the messages that should be stored in the transmit buffers when changeover occurs, (b) the maximum allowable error rate on the link, and (c) the duration of the fixed time interval.

10 Claims, 5 Drawing Sheets

METHOD AND APPARATUS FOR TRANSMISSION LINK ERROR RATE MONITORING

FIELD OF THE INVENTION

This invention relates generally to monitoring equipment used in telecommunications systems, and, in particular, to an error rate monitor or detector that monitors the transmission quality of a transmission link to determine when the link should be taken out of service due to excessive transmission errors.

BACKGROUND OF THE INVENTION

An error rate monitor is disposed in the receivers associated with a telecommunications transmission link and arranged to monitor errors occurring in messages transmitted over the link from transmitters associated with the link. Typically, the transmitters include transmit buffers in which messages awaiting transmission are stored or queued. The error rate monitor is supposed to take the link out of service (perform a "changeover") if an error rate greater than a predetermined maximum ($\lambda_0$) persists. While different factors govern the design of a monitor, one known design criterion is that the total length measured (in bits, bytes, octets, etc.) of the unsuccessfully transmitted messages stored in the transmit buffer when changeover occurs (excluding data stored in the transmit buffer prior to the onset of errors and after changeover is declared) should be no more than $\Omega$, when the link is operated at a maximum agreed upon utilization (engineered load) of $\rho$ or less.

One existing arrangement for an error rate monitor, called a Signaling Unit Error Rate Monitor, or SUERM for short, is used to monitor errors on a signaling link connecting signaling nodes in a SS7 signaling system. A SUERM uses two counters, that maintain counts $C_1$ and $C_2$. $C_1$ (initially 0) is incremented on each errored message. $C_2$ (initially 0) is incremented for each message. When $C_1$ exceeds a threshold, $T_1$, the need for a changeover is declared. When $C_2$ exceeds a threshold, $T_2$, $C_1$ is decremented (to a minimum of zero) and $C_2$ is reset to zero. When a signaling link loses synchronism (typically during an error burst—the most common error phenomenon), the SUERM enters octet counting mode, wherein messages are modeled as being 16 octets long which are all counted as being errored.

For high speed signaling links, the current SUERM design disadvantageously requires the use of very high quality transmission media, i.e., media in which the background bit error rate is very low. This is because this design for a SUERM cannot distinguish adequately between the situation where many errored messages occur relatively close to each other within the round trip delay of the transmission medium (having the same effect on the total length of the messages stored in the transmit queue as a single errored message) and the situation where the same number of errored messages occur, but are spaced further apart in time, such as where the spacing between successive errored messages is about equal to the round trip delay. In the latter situation, the per error impact on the system is much greater than in the former situation. Because of this inability to distinguish between a relatively benign condition and a much more serious condition, a system which uses the current design must generally be "overdesigned" in temps of higher quality transmission media, thus compensating for the lower effectiveness of the SUERM.

Another arrangement for an error rate monitor is described in U.S. Pat. No. 4,385,383 issued to R. Karchevski on May 24, 1983. In the arrangement described in the patent, a transmission link is monitored for errors during each of a series of fixed time intervals (windows). If one or more errors occur within a window, the count maintained in a counter is incremented by one unit. If no errors occur within the window, the counter is decremented by one unit. When the count in the counter reaches a threshold value, the need for a changeover is declared, or an alarm is sounded. This arrangement is not practical as a SUERM, because it usually results in a situation where an excessive amount of information would have to be stored in the transmit buffer when the need for a changeover is declared. Also, this monitor, which enforces $\lambda_0$, requires an excessive time period to respond to an error condition that requires a changeover.

SUMMARY OF THE INVENTION

In accordance with one embodiment of the present invention, an error rate monitor which can be used as a SUERM to monitor errors that occur in a signaling link is arranged to determine increment and decrement values as a joint function of (a) the round trip delay $\tau$ on the transmission link, (b) the maximum allowable error rate $\lambda_0$ on the link, and (c) the link speed c, so that, in general, the increment and decrement values are significantly different. The system monitors errors on the link for intervals of $\tau$ seconds. If one or more errors occur in an interval, the increment is added to a counter (originally initialized to zero). If no errors occur in the interval $\tau$, the decrement is subtracted from the counter, to a minimum of zero. When the counter exceeds a given threshold, T; the need for a changeover is declared. In accordance with the invention, the value of T is determined as a joint function of (a) $\Omega$, which, as stated previously, is the maximum amount of data in the messages that should be stored in the transmit buffers when changeover occurs, (b) $\lambda_0$, and (c) $\tau$.

In accordance with a more generalized embodiment of the present invention, an estimate "q" of the number of messages stored in the transmit buffer as a result of link errors, which is thus an estimate of the amount of data requiring retransmission, is computed by summing a series of contributions $\Delta q$ that occur over a plurality of "n" subintervals which together comprise the time interval "$\tau$". Each contribution is a function of the probability of requiring a retransmission during the subinterval, due to a transmission error, which is in turn computed as a function of the probability that e errors occur during the time subinterval "$\tau/n$" will corrupt at least one message. Both the generalized embodiment and the first above-described embodiment, can be implemented in a finite state machine, microprocessor, recursive digital filter, or other suitable hardware, firmware or software implementation.

The error rate monitor of the present invention advantageously de-emphasizes the significance of closely spaced errors on link error performance and emphasizes the significance of more spread out errors on link error performance. In effect, the error rate monitor at the receiving end of a link constructs a model of the transmitting end's queue based on errors. This permits a more accurate response to errors than with current arrangements.

The monitor arrangement of the present invention significantly reduces unnecessary changeovers and at the same time reduces buffering requirements on the transmit end of the transmission links. This improves the performance of the telecommunications network in which the transmission links are used, and, more importantly, makes higher speed transmission links (1.5 mb/s and above) possible without demanding stringent transmission quality. This is turn allows substantial relaxation in the performance objectives relating to factors such as call setup time. A properly engineered network is much less likely to go "into congestion", a condition in which traffic is temporarily shut down due link changeovers.

The error rate monitor of the present invention is simpler to implement than existing arrangements, since octet counting mode is unnecessary. Also, only one counter is required. Our invention also uses less real time than existing arrangements, in performing the desired monitoring function. This is a critical resource on high speed (e.g. 1.5 mb/s) transmission links.

BRIEF DESCRIPTION OF THE DRAWING

The present invention will be more fully appreciated by reading the following detailed description in conjunction with the attached drawing in which.

DETAILED DESCRIPTION

Figure 1:
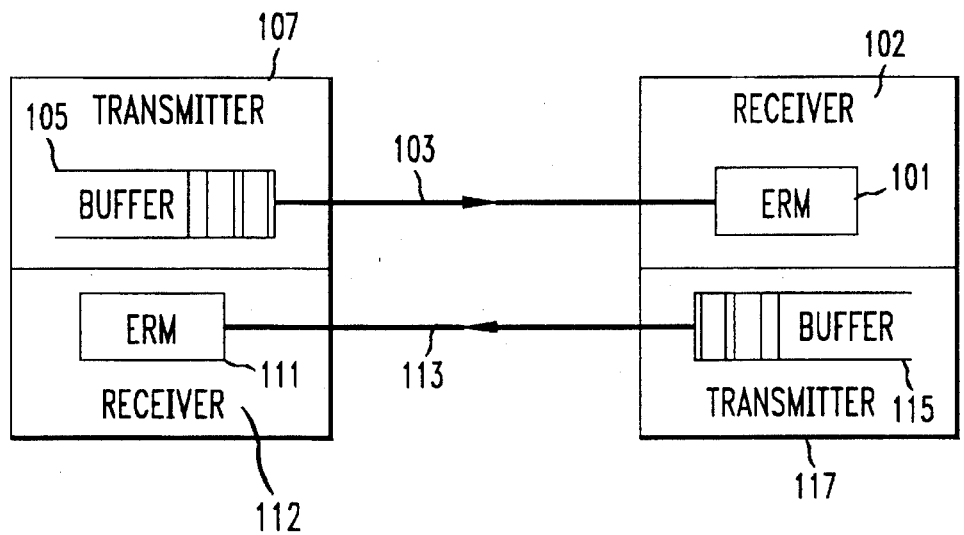
FIG. 1 is a block diagram illustrating the location of an error rate monitor within a receiver attached to a communications link, and the associated transmit buffer in the transmitter at the opposite end of the link.

As shown in FIG. 1, an error rate monitor 101 resides in a receiver 102 coupled to a first transmission medium 103 which carries messages to receiver 102 that originate in a transmitter 107. A separate error rate monitor 111 resides in an associated receiver 112 coupled to a second transmission medium 113 carrying messages originating in transmitter 117 and traveling in the opposite direction. Messages originating in transmitter 107 are applied to transmission medium 103 via a first buffer 105, while a second buffer 115 is similarly provided in transmitter 117. Together, transmission media 103 and 113 comprise a transmission link, which can be a SS7 signaling link, for example.

Each error rate monitor 101 and 111 performs the function of a "circuit breaker". It removes a link (transmission medium 103 and its mated transmission medium 113) from service before error events preclude the link from meeting desired performance objectives. Balanced against the desire to ensure link quality is the need to "ride over" temporary events which only momentarily degrade performance.

The basic error correction scheme implemented in a transmission link such as a SS7 signaling link is a "go-back-n" strategy. For example, when error rate monitor 101 detects an error in messages from transmitter 107 transmitted using transmission medium 103, transmitter 107 is notified via transmission medium 113, and retransmission of all messages, beginning with the first message not correctly received, commences. This causes an increase in the message service time of the first retransmitted message by the round trip delay between transmitter 107 and the receiver 102, plus the message emission time. Meanwhile, incoming signaling traffic will be queued in transmit buffer 105. As error rates increase, this can lead to unacceptable (but stable) queuing delays and, at high error rates, unstable queues which can make the network appear as if it is overloaded.

Figure 2:
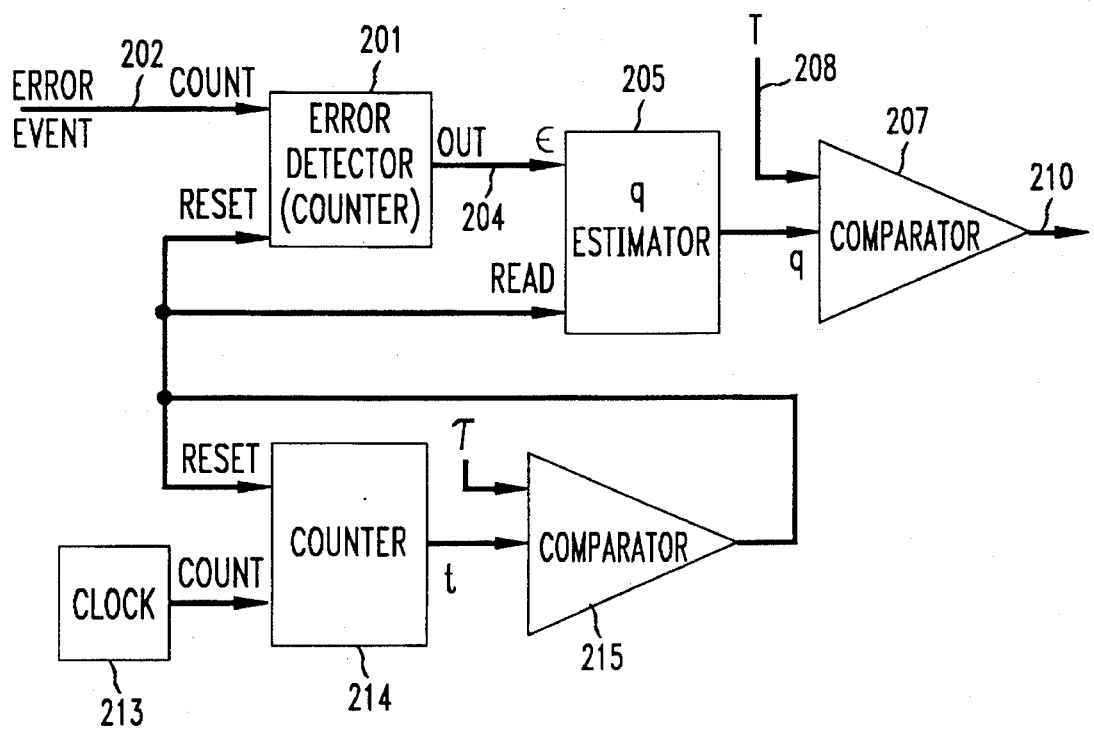
FIG. 2 is a block diagram illustrating the major components of the error rate monitor of FIG. 1.

Referring now to FIG. 2, there is shown a block diagram illustrating the major components of error rate monitor 101 or 111 of FIG. 1, arranged in accordance with the present invention. Time intervals of duration $\tau$ are measured by counting the output of a clock 213 using a counter 214, and by comparing the counter output "t" to the desired interval length $\tau$ in a comparator 215. When $t=\tau$, the high output from comparator 215 is used to reset counter 214. Also, an error detector (counter) 201 is reset or initialized, at the beginning of each time interval by an output from comparator 215, which is applied to the RESET input of detector 201. During each time interval, detector 201 counts error events occurring on the transmission link being monitored, indicated by a high input on line 202, which is connected to the count (increment) input of the detector. The output from comparator 215 is also applied to the read input of a "q" estimator 205. This causes the contents of detector 201, representing the number e of errors detected in each time interval, to be applied to estimator 205 via line 204. A resulting estimate "q" of the length of the messages queued in the transmit buffer 105 or 115 of FIG. 1 is computed in estimator 205 (in the manner described below) and compared in a comparator 207 with a threshold value T applied on line 208. If the threshold is exceeded, a high output from comparator 207 on line 210 signals that a changeover should be effected, meaning that the transmission link should be taken out of service and traffic re-routed to another link. If the threshold is not exceeded, monitoring continues during successive time intervals, with the error count in detector 201 being again reset.

Figure 3:
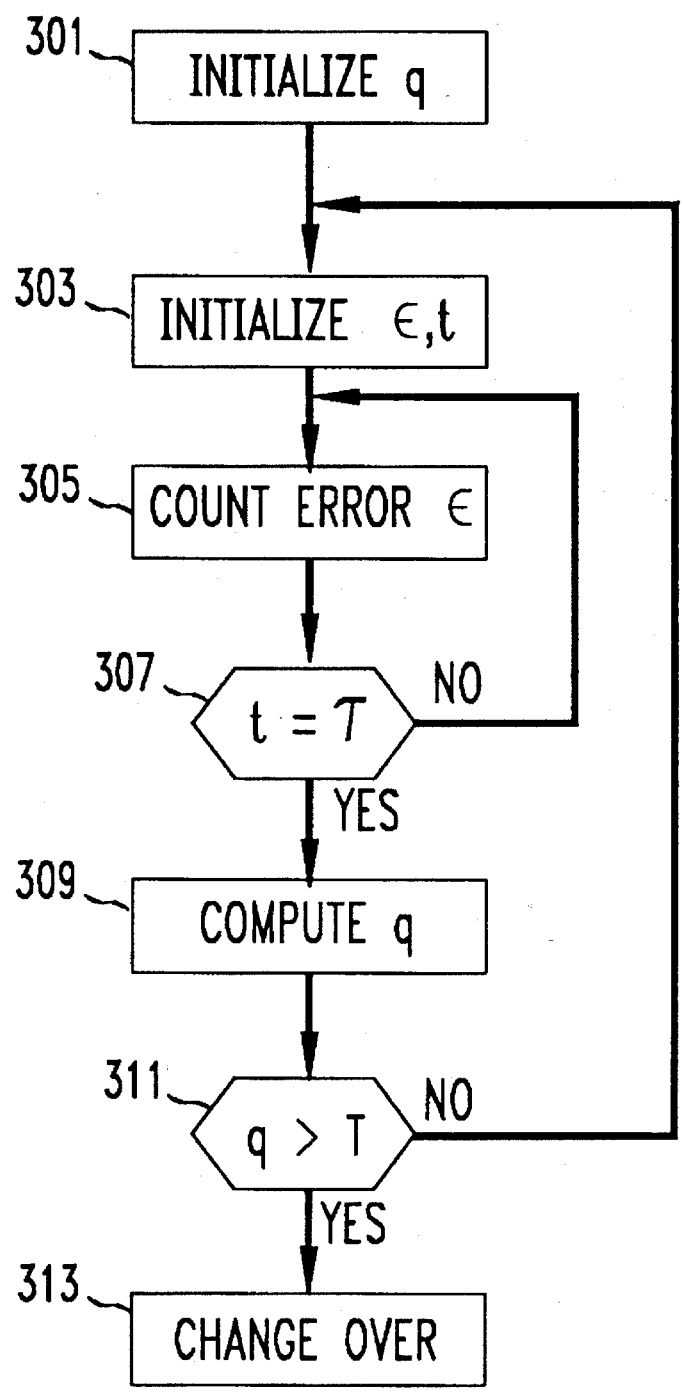
FIG. 3 is a flow diagram illustrating the steps followed by the error rate monitor of FIG. 2.

The process performed by the monitor of FIG. 2 is illustrated in flow diagram form in FIG. 3. When the process begins, the value of q is initialized (set to 0) in step 301 and the values of $\epsilon$ and the time variable t in counter 214 are reset in step 303. Then, in step 305, the number of errors $\epsilon$ occurring on the transmission link are counted. Counting continues as long as a negative result is reached in test step 307, indicating that the time variable t has not reached the end of the counting interval $\tau$. At the end of the interval, a positive result is reached in step 307 when the output of comparator 215 is high, causing a computation of q to be made in step 309. If, in test step 311, the value of q exceeds threshold T, the output of comparator 207 goes high indicating that a changeover should be declared in step 313. Otherwise, the process continues by repeating steps 303–311.

Figure 4:
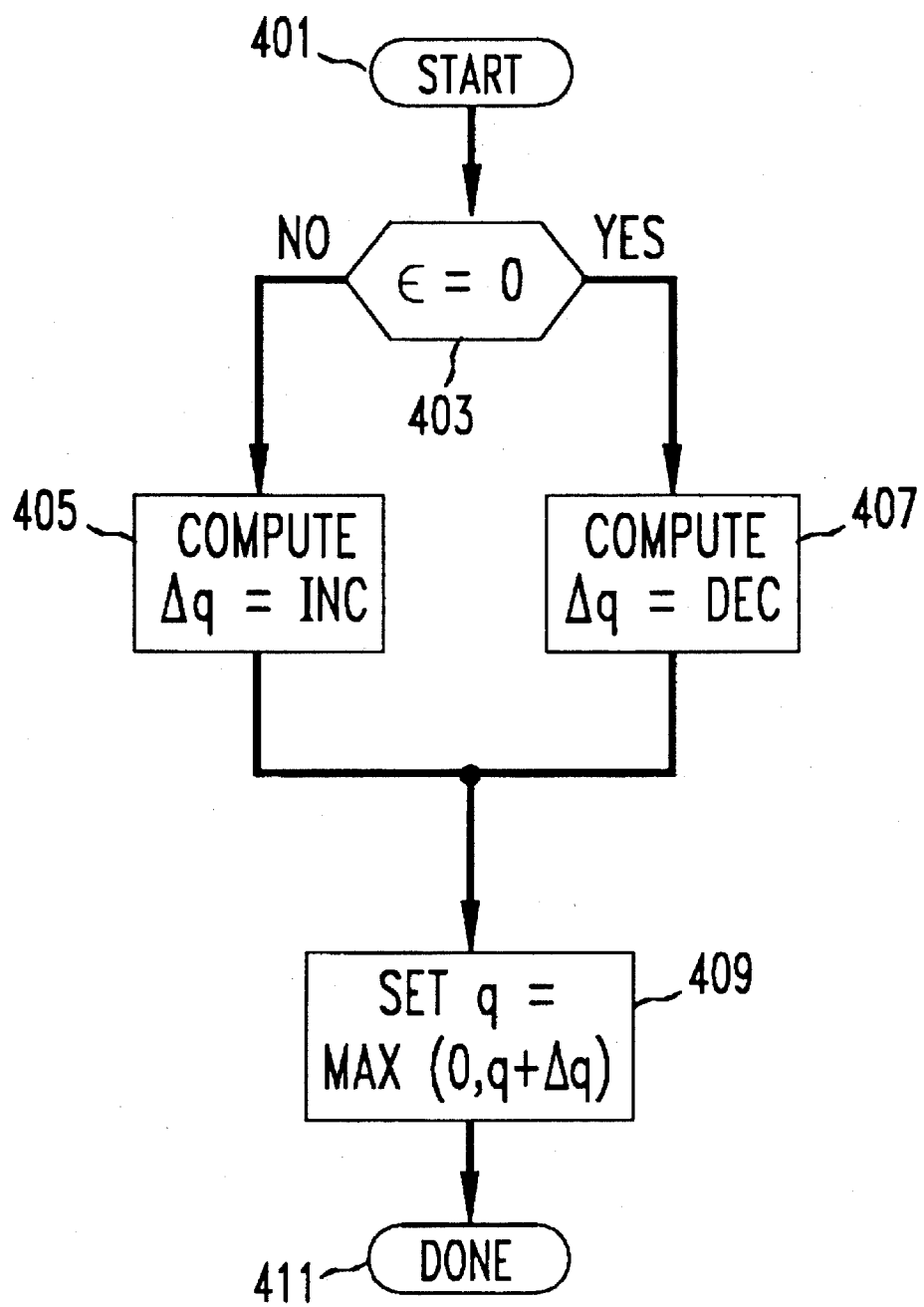
FIG. 4 is a flow diagram illustrating in more detail the steps performed when the value of q is computed in step 309 of FIG. 3.

FIG. 4 is a flow diagram illustrating in more detail the process of computing the value of q performed in q estimator 205 in step 309 of FIG. 3. The process begins in step 401 at the end of each time interval, $\tau$. At that time, a determination is made in step 403 as to whether any errors occurred in the previous interval. If so, the change $\Delta q$ in the value by which the then-existing value q is increased, denominated "INC" in FIG. 4, is calculated in step 405. If not, the change Δq in the value by which that value of q is decreased, denominated "DEC" in FIG. 4, is calculated in step 407. Note that these values are, in general, significantly different from each other. Following steps 405 or 407, the value of q is set, by adding the value of Δq, which can be positive or negative, to the then-existing value of q. Because the value of q, which represents the queue length, i.e., the length of the messages currently stored, in buffer 105 or 115, cannot be less than zero, the calculation performed in step 409 is equivalent to determining the maximum of the values 0 and q+Δq. The process is then terminated in step 411.

The values of INC and DEC computed in steps 405 and 407, are, in accordance with the present invention, functions of (a) τ, the round trip delay on the transmission link (measured in seconds), (b) $\lambda_0$, the maximum allowable error rate on the link (measured as errors per second), and (c) c, the link speed (measured in bits, bytes or octets per second). Specifically, INC is given by:

$$\hat{\rho}^* c \tau \quad (1)$$

and
DEC is given by:

$$[1-\hat{\rho}]^* c^* \tau, \quad (2)$$

where
$\hat{\rho}$ is a virtual utilization factor for the transmission link calculated as $$\hat{\rho} = e^{-\lambda_0 \tau}. \quad (3)$$

Computing the values of INC and DEC in this way will guarantee that the error rate monitor will initiate a changeover if error rates greater than $\lambda_0$ persist, but will not do so if error rates greater than $\lambda_0$ are transient phenomena.

The value of T used in step 311 of FIG. 3 and applied to comparator 207 on line 208, is proportional to Ω, the maximum number of bits, bytes, octets, etc. that can be stored in the transmit buffers multiplied by a proportionality constant $\hat{\rho}/\rho$, which is the ratio of the virtual utilization of the transmission link to the engineered utilization of the link. This proportionality constant compensates for the fact that the signalling link is designed (engineered) using a utilization (namely $\hat{\rho}$) that is higher than the actual utilization (namely ρ).

If it is desired to formulate an estimate the value of q with even more precision that that obtained using the relationships set forth above, a more generalized implementation of the present invention may be used. This implementation involves somewhat more computational complexity, but produces results that are likely to be a better approximation of the length of the messages in the transmit buffer as a result of the occurrence of transmission errors. Briefly stated, in the more generalized implementation, an estimate "q" of the number of messages stored in the transmit buffer as a result of link errors is computed by summing a series of contributions Δq that occur over a plurality of "n" subintervals which together comprise the time interval "τ". The subintervals are identified by an index value i, where i=1 to n. Each contribution is a function of the probability $r_i$ of initiating a retransmission during the subinterval, due to a transmission error, which is in turn computed as a function of the probability that ε errors during the time interval "τ/n" will corrupt at least one message.

In the more generalized implementation, comparator 215 of FIG. 2 produces a high output when the value of t output from counter 214 is equal to τ/n. Likewise, in FIG. 3, the values of $r_i$ are initialized to zero in step 303, and the test performed in step 307 determines if t=τ/n. The computation of Δq in steps 403, and 407 proceeds as a summation, as follows:

$$\Delta q = \left( \hat{\rho} - ((1-\rho^*)^\epsilon) \left( 1 - \sum_{j=1}^{n-1} r_j \right) \right) c \frac{\tau}{n}. \quad (4)$$

In equation (4), $r_i$ can be determined from the following equations:

$$r_i = r_{i+1}, 1 \leq i \leq n-1 \quad (5)$$

and $$r_n = (1-(1-\rho^*))^\epsilon \left( 1 - \sum_{j=1}^{n-1} r_j \right) \quad (6)$$

In equations (4) and (6), $\rho^*$ represents the effective utilization of the signaling link (the utilization including retransmitted messages). This is bounded between ρ and 1. In the general case, $\hat{\rho}$ is determined as follows:

$$\hat{\rho} = \left( \frac{e^{-\rho^* \lambda_0 \frac{\tau}{n}}}{((n-1)(1-e^{-\rho^* \lambda_0 \frac{\tau}{n}})+1)} \right). \quad (7)$$

Note that the generalized implementation described by equations (4), (5), (6) and (7) reduces to the embodiment described earlier when n=1 and p*=1.

In order for the error rate monitor to operate in the desired manner, two performance objectives are defined. (1) An error rate monitor which ensures acceptable link quality will be considered "safe", and (2) an error rate monitor which is tolerant to short-term phenomena will be considered "effective". Criteria for safe and effective error rate monitors can also be stated as follows:

First, the monitor must assure that the error rate does not exceed the maximum rate which can be tolerated indefinitely by the signaling link without causing intolerable transmission delay on the link. This error rate is determined from the maximum stable queuing delay and queuing delay sensitivity (under error), assuming a particular link load such as 2 $\rho_{max}$, where $\rho_{max}$ is the maximum engineered load of the signaling link.

Second, the monitor must assure that the maximum amount of data which can be added to the transmit buffer queue due to error phenomena during a link failure (changeover transient) is not exceeded. Stated differently, this criterion is used to ensure that a failing link will not inappropriately exceed transmit buffer signaling link congestion thresholds when it is operating at engineered loads.

Figure 5:
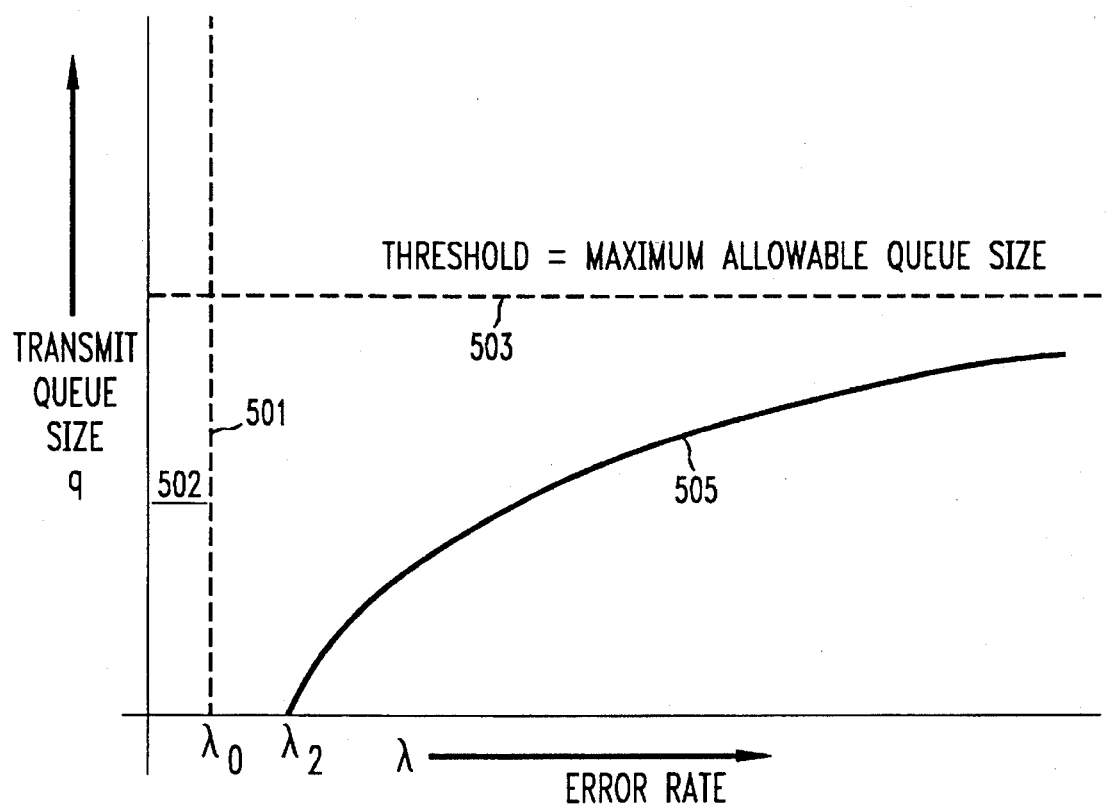
FIG. 5 is a graph illustrating the performance requirements for an error rate monitor which can be used in a signalling system and the performance results obtained using an error rate monitor arranged in accordance with the present invention.

FIG. 5, which is a plot of transmit queue sizes versus error rates, illustrates both the performance requirements for a safe and effective error rate monitor, and the results obtained using an error rate monitor arranged in accordance with the present invention. The dashed vertical line 501 at $\lambda=\lambda_0$ is at maximum allowable error rate. Error rates in the region 502 to the left of $\lambda_0$ produce signaling link delays which meet delay standards. Error rates to the fight of $\lambda_0$ yield link delays which do exceed delay standards. If an error rate $\lambda > \lambda_0$ persists for a sufficient time, the error rate monitor must take the link out of service. The horizontal dashed line 503 identifies the maximum transmit buffer occupancy or queue which is allowed at any error rate. Thus, a plot of queue size versus error rate for a safe error rate monitor must be below line 503 for all error rates to the fight of the line 501. Shown on FIG. 5 is curve 505, which represents an error rate monitor of the type shown in FIG. 2. As seen from FIG. 5, this error rate monitor satisfies the performance objectives: for error rates below a value identified as $\lambda_2$, the transmit queue does build up, but the buildup is stable. This buildup translates to an increase in transmission delay on the link. For error rates above $\lambda_2$, the transmit queue buildup is unstable, i.e., ever increasing. However, the queue is always below the maximum allowable queue size represented by line 503. Curve 505 also demonstrates that the error rate monitor of this invention is "effective". This is indicated by the fact that curve 505 asymptotically approaches line 503 for increasingly large values of $\lambda$. This has the effect of deferring a changeover unless it is "really" necessary, thereby precluding a changeover under the most common error condition, namely transient error bursts, for which a changeover is not actually called for.

Figure 6:
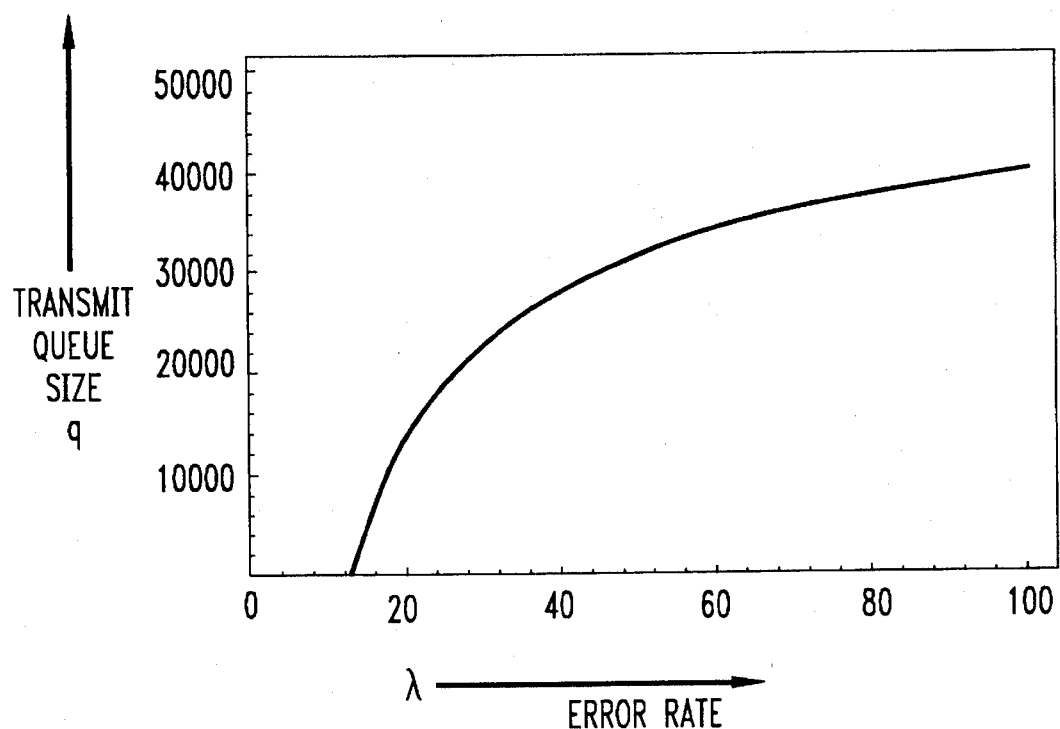
FIG. 6 shows the characteristics of another error rate monitor arranged in accordance with the present invention, using different operating parameters.

FIG. 6 shows the characteristics of another error rate monitor arranged in accordance with the present invention, using different operating parameters. For this arrangement, a 1.544 mb/s link (c=1.544 mb/s) is assumed, and $\tau=.115$ seconds; n=1; $\lambda_0=.095$; $\rho^*=1$; $\Omega=400,000$ bits; and $\rho=0.4$. As a result, $\hat{\rho}=0.9895$, INC=70,278 and DEC=1,864. The value of T=989,500 bits.

Figure 7:
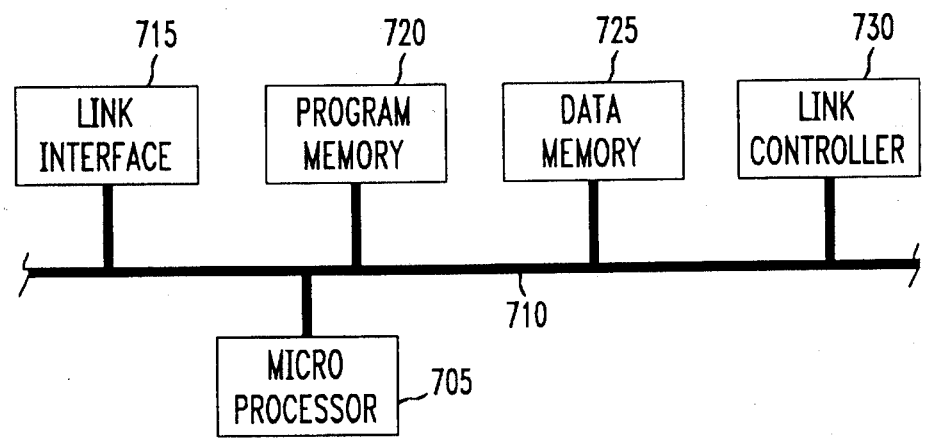
FIG. 7 illustrates a hardware arrangement including a microprocessor operating under software control, for implementing the present invention.

FIG. 7 illustrates a hardware arrangement including a microprocessor 705 operating under software control, for implementing the present invention. Microprocessor 705 communicates with a program memory 720, containing suitable programs for performing the processes illustrated in FIGS. 3 and 4, via a common bus 710. Information concerning the occurrence of errors on the transmission link being monitored is applied to processor through a link interface 715, which is also connected to bus 710. Information needed for the calculation of q, namely INC and DEC, $\hat{\rho}$ (virtual utilization factor), effective utilization of the signaling link, $\rho^*$, the value of $r_i$, and various coefficients and constants, may be stored in data memory 725, and supplied to microprocessor 705 via bus 710 when needed. Data memory 725 also stores the previous value of q as well as the value of threshold T. If a changeover is declared, the link can be taken out of service by a signal generated by microprocessor 705 which is supplied to a link controller 730 via bus 710.

While the error rate monitor of the present invention can be thought of as being similar to systems using a "leaky bucket"technique, there are significant differences. Traditional leaky buckets either fill up at a fixed rate (with time, traffic etc.) and empty out at a rate determined by events (messages, errors etc) or vice versa. Some sort of enforcement action is taken when a predetermined threshold is reached. The main difference between the error rate monitor of the present invention, in its simplest embodiment as shown in FIGS. 3 and 4, and general leaky bucket schemes, is the fact that our invention monitors the traffic for errors for an interval. It determines whether or not any errors have occurred within the interval and treats one error or multiple errors within this interval identically. Our error rate monitor merely notes whether errors have occurred in an interval. At the end of the interval, it will either increment or decrement a counter and compare the results with a threshold. The increment and decrement values are carefully formulated and, in general, are not equal. More specifically, the increment and decrement values are determined as a joint function of (a) the round trip delay on the transmission link, (b) the maximum allowable error rate on the link, and (c) the link speed.

Various modifications and adaptations may be made to the present invention by those skilled in the art. For this reason, it is intended that the invention be limited only by the appended claims.

I claim:

1. Apparatus for monitoring the error rate in messages transmitted over a transmission link so that the link can be taken out of service if excessive errors occur, said transmission link including a buffer for storing messages so that messages not successfully transmitted on said link are available for subsequent retransmission on said link, said apparatus comprising means for counting the number of errors occurring on the link during successive time intervals of $\tau$ seconds, where $\tau$ is the round trip time required to transmit a message on said transmission link and then notify said buffer to initiate a retransmission, means responsive to said counting means for formulating an estimate of the amount of data requiring retransmission on said link due to errors, said estimate being a joint function of (a) said round trip time $\tau$, (b) the maximum allowable error rate $\lambda_0$ on said link, and (c) the speed "c" of said link, means for comparing said estimate to a threshold value determined as a joint function of (a) $\Omega$, the maximum allowed amount of data requiring retransmission, (b) $\lambda_0$, and (c) $\tau$, and means for taking said transmission link out of service when said estimate exceeds said threshold.

2. Apparatus for controlling a transmission link arranged to receive messages from a remote transmission source, said messages being stored in said remote source until error free receipt in a receiver is assured, said apparatus including means for formulating an estimate "q" of the number of messages stored as a result of transmission errors on said link, said estimate being formed by summing a series of contributions $\Delta q$ that occur over a plurality of "n" subintervals which together comprise the time interval "$\tau$" representing the round trip transmission time of a message between said transmission source and said receiver, wherein each of said contributions is a function of the probability of initiating a retransmission during the subinterval due to a transmission error, means for generating a signal to take said link out of service if said estimate exceeds a predetermined threshold, and means for taking the link out of service in response to said signal.

3. The invention defined in claim 2 wherein said formulating means includes means for (a) increasing the value of q by a predetermined increment if one or more transmission errors occur in a subinterval, and (b) decreasing the value of q by a predetermined decrement if no transmission errors occur in a subinterval.

4. The invention defined in claim 3 wherein said increment values are determined as a joint function of (a) said time interval $\tau$, (b) the maximum allowable error rate on said transmission link, and (c) the speed of said transmission link.

5. A system for monitoring the error rate on a transmission link, said link being arranged to transport messages from a transmitter to a receiver, said transmitter including a buffer for storing messages including messages requiring retransmission to said receiver due to transmission errors on said link, said system comprising means for formulating an estimate of the total length of the messages in said buffer due to said transmission errors, wherein said formulating means includes means for monitoring the link for successive time intervals, and means for adding an increment to the estimate if one or more errors occurred in the interval, and for subtracting a decrement from the estimate if no errors occur in the interval, means for monitoring the estimate to ascertain when the length of the messages stored in said buffer exceeds a threshold, and means for taking the link out of service if the threshold is exceeded.

6. A method for monitoring the error rate in messages transmitted over a transmission link so that the link can be taken out of service if excessive errors occur, said transmission link arranged to buffer messages such that messages not successfully transmitted on said link are available for subsequent retransmission on said link, said method comprising the steps of counting the number of errors occurring on the link during successive time intervals of $\tau$ seconds, where $\tau$ is the round trip time required to transmit a message on said transmission link and then notify said buffer to initiate a retransmission, responsive to said counting step, formulating an estimate of the amount of data requiring retransmission on said link due to errors, said estimate being a joint function of (a) said round trip time $\tau$, (b) the maximum allowable error rate $\lambda_0$ on said link, and (c) the speed "c" of said link, comparing said estimate to a threshold value determined as a joint function of (a) $\Omega$, the maximum allowed amount of data requiring retransmission, (b) $\lambda_0$, and (c) $\tau$, and taking said transmission link out of service when said estimate exceeds said threshold.

7. A method of controlling a transmission link arranged to receive messages from a remote transmission source, said messages being stored in said remote source until error free receipt in a receiver is assured, said method including the steps of formulating an estimate "q" of the number of messages stored as a result of transmission errors on said link, said estimate being formed by summing a series of contributions $\Delta q$ that occur over a plurality of "n" subintervals which together comprise the time interval "$\tau$" representing the round trip transmission time of a message between said transmission source and said receiver, wherein each of said contributions is a function of the probability of initiating a retransmission during the subinterval due to a transmission error, generating a signal to take said link out of service if said estimate exceeds a predetermined threshold, and taking the link out of service in response to said signal.

8. The invention defined in claim 7 wherein said formulating step includes (a) increasing the value of q by a predetermined increment if one or more transmission errors occur in a subinterval, and (b) decreasing the value of q by a predetermined decrement if no transmission errors occur in a subinterval.

9. The method defined in claim 8 wherein said increment values are determined as a joint function of $\tau$, the maximum allowable error rate on said transmission link and the speed of said transmission link.

10. A method for monitoring the error rate on a transmission link, said link being arranged to transport messages from a transmitter to a receiver, said transmitter including a buffer for storing messages including messages requiring retransmission to said receiver due to transmission errors on said link, said system comprising the steps of formulating an estimate of the total length of the messages in said buffer due to said transmission errors, wherein said formulating step includes monitoring the link for successive time intervals, adding an increment to the estimate if one or more errors occurred in the interval, and subtracting a decrement from the estimate if no errors occurred in the interval, monitoring the estimate to ascertain when the length of the messages stored in said buffer exceeds a threshold, and taking the link out of service if the threshold is exceeded.

* * * * *